United States Patent

Quinn et al.

(10) Patent No.: US 10,055,126 B2
(45) Date of Patent: Aug. 21, 2018

(54) SYSTEMS AND METHODS FOR DYNAMIC TRANSCEIVER PATH ADAPTATION BASED ON MEASUREMENTS FROM MULTIPLE SENSORS

(71) Applicant: Dell Products L.P., Round Rock, TX (US)

(72) Inventors: Liam B. Quinn, Austin, TX (US); Liam Prendergast, Limerick (IE)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 14/260,597

(22) Filed: Apr. 24, 2014

(65) Prior Publication Data

US 2015/0311943 A1    Oct. 29, 2015

(51) Int. Cl.
*H04B 1/40*    (2015.01)
*G06F 3/06*    (2006.01)

(52) U.S. Cl.
CPC .................. *G06F 3/0601* (2013.01)

(58) Field of Classification Search
CPC ........ G01S 19/11; G01S 19/23; G01S 19/246; G01S 5/021; G01S 5/0289; H01Q 1/242; H01Q 3/24; H01Q 3/34; H03H 7/40; H04B 1/006; H04B 1/0458; H04B 1/40; H04B 7/061; H04B 7/0617; H04B 7/0623; H04B 7/0695; H04B 7/0814; H04B 7/2621; H04L 5/001; H04L 5/0023; H04L 5/0028; H04L 5/08; H04L 5/1461

See application file for complete search history.

(56) References Cited

U.S. PATENT DOCUMENTS

| | | | | |
|---|---|---|---|---|
| 2011/0086601 A1* | 4/2011 | Ali | .......................... | H01Q 1/243 455/121 |
| 2011/0105023 A1* | 5/2011 | Scheer | .................... | H01Q 1/242 455/41.2 |
| 2011/0250928 A1* | 10/2011 | Schlub | .................... | H01Q 1/243 455/550.1 |
| 2013/0109448 A1* | 5/2013 | Garrett | ................. | H04B 7/0617 455/575.7 |
| 2013/0231066 A1* | 9/2013 | Zander | ...................... | H04B 7/02 455/73 |
| 2013/0325149 A1* | 12/2013 | Manssen | ................. | G05B 13/02 700/37 |
| 2013/0335280 A1* | 12/2013 | Chen, III | ............... | H01Q 21/28 343/725 |
| 2014/0118190 A1* | 5/2014 | Mendolia | ................. | H04B 7/00 342/367 |
| 2015/0063131 A1* | 3/2015 | Montemurro | ..... | H04W 52/0216 370/252 |

* cited by examiner

*Primary Examiner* — Golam Sorowar
(74) *Attorney, Agent, or Firm* — Jackson Walker L.L.P.

(57) ABSTRACT

In accordance with embodiments of the present disclosure, a wireless network interface may include a transmit/receive path comprising an antenna for transmitting and receiving wireless transmissions and a baseband controller communicatively coupled to the transmit/receive path and configured to receive fused sensor information indicative of environmental conditions detected by a plurality of sensors and, based on the fused sensor information, tune one or more parameters of the transmit/receive path.

14 Claims, 3 Drawing Sheets

US 10,055,126 B2

SYSTEMS AND METHODS FOR DYNAMIC TRANSCEIVER PATH ADAPTATION BASED ON MEASUREMENTS FROM MULTIPLE SENSORS

TECHNICAL FIELD

The present disclosure relates in general to information handling systems, and more particularly to adaptation of components of a transceiver path based on measurements derived from a plurality of sensors in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The presence of wireless communication technology (e.g., Wi-Fi, Bluetooth, mobile broadband telephony, etc.) in information handling systems is becoming increasingly prevalent. An information handling system enabled for wireless communication technology typically employs radio and antenna subsystems for receiving and transmitting wireless electronic signals. In typical implementations, such a radio subsystem is not configured to adapt to changes in a user's environment to deliver best possible performance of the radio subsystem. For example, while a radio frequency synthesizer may be able to dynamically tune to different frequency channels in order to establish network connections (e.g., to mobile basestation, Wi-Fi access point, etc.), a radio transceiver typically utilizes fixed impedance matching components in a transceiver path. When an environment of a user of the information handling system (in particular tablets, mobile telephones, and other smart mobile computing platforms) changes (e.g., a user moves hands, changes device orientation, etc.) the impedance matching of the transceiver path may become degraded, potentially reducing antenna efficiency, increasing power consumption, and diminishing user experience.

SUMMARY

In accordance with the teachings of the present disclosure, one or more disadvantages and problems associated with performance of radio frequency communication of an information handling system may be reduced or eliminated.

In accordance with embodiments of the present disclosure, an information handling system may include a processor, a plurality of sensors, each sensor configured to detect an environmental condition of the information handling system, a sensor controller communicatively coupled to the processor, and a wireless network interface communicatively coupled to the processor. The sensor controller may be configured to receive from each of the plurality of sensors a signal indicative of the environmental condition detected by such sensor and generate fused sensor information indicative of the environmental conditions detected by the plurality of sensors. Thr wireless network interface may include a transmit/receive path comprising an antenna for transmitting and receiving wireless transmissions and a baseband controller communicatively coupled to the transmit/receive path and the processor and configured to receive the fused sensor information and, based on the fused sensor information, tune one or more parameters of the transmit/receive path.

In accordance with these and other embodiments of the present disclosure, a wireless network interface may include a transmit/receive path comprising an antenna for transmitting and receiving wireless transmissions and a baseband controller communicatively coupled to the transmit/receive path and configured to receive fused sensor information indicative of environmental conditions detected by a plurality of sensors and, based on the fused sensor information, tune one or more parameters of the transmit/receive path.

In accordance with these and other embodiments of the present disclosure, a method may include receiving fused sensor information indicative of environmental conditions detected by a plurality of sensors and, based on the fused sensor information, tune one or more parameters of a radio transmit/receive path comprising an antenna.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
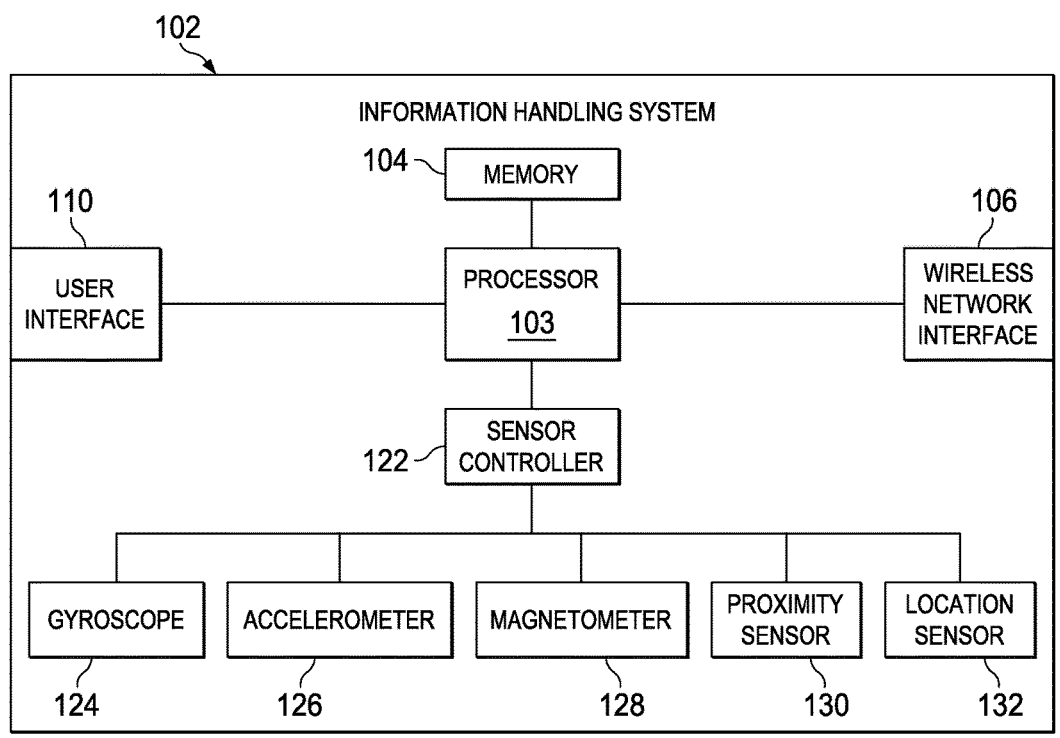
FIG. 1 illustrates a block diagram of an example information handling system, in accordance with certain embodiments of the present disclosure.
Figure 2:
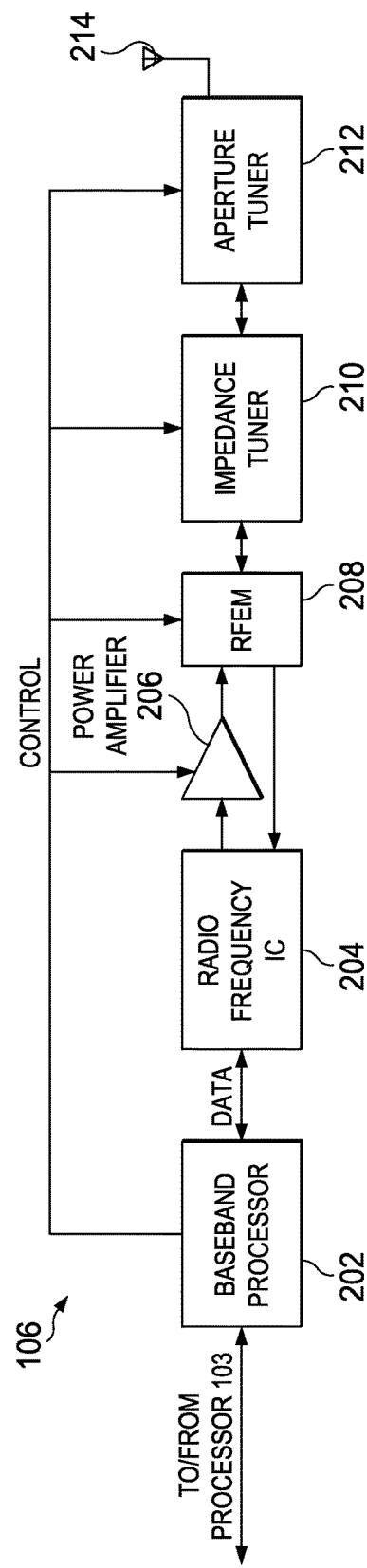
FIG. 2 illustrates a block diagram of selected components of an example wireless network interface, in accordance with certain embodiments of the present disclosure.
Figure 3:
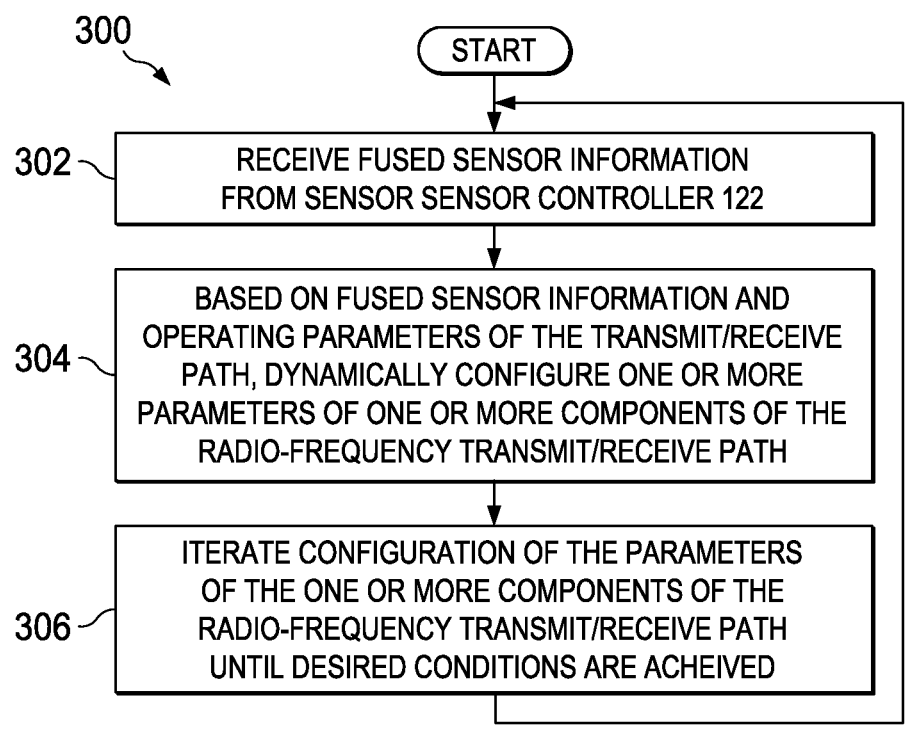
FIG. 3 illustrates a flow chart of an example method 300 for dynamic transmit/receive path adaptation based on sensor data, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

FIG. 1 illustrates a block diagram of an example information handling system 102. In some embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a wireless network interface coupled to processor 103, a user interface 110 communicatively coupled to processor 103, a sensor controller 122 communicatively coupled to processor 103, and a plurality of sensors coupled to a sensor controller 122, wherein such sensors may include two or more of a gyroscope 124, a accelerometer 126, a magnetometer 128, a proximity sensor 130, and a location sensor 132, and any other suitable sensor.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Wireless network interface 106 may include any suitable system, apparatus, or device operable to serve as an interface between its associated information handling system 102 and a network, such that information handling system 102 may communicate signals to and from wireless network interface 106 via wireless transmissions (e.g., mobile telephony, Wi-Fi, Bluetooth, mobile broadband telephony).

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Sensor controller 122 may include any system, device, or apparatus configured to manage and/or control operation of sensors of information handling system 102, including receiving and processing signals from the various sensors indicative of environmental conditions (e.g., physical quantities or other measurements) detected by such sensors. Sensor controller 122 may also be configured to communicate signals to processor 103 indicative of environmental conditions detected by sensors.

Gyroscope 124 may be communicatively coupled to sensor controller 122, and may include any system, device, or apparatus configured to measure an orientation of information handling system 102 (e.g., based on an angular momentum experienced by information handling system 102).

Accelerometer 126 may be communicatively coupled to sensor controller 122, and may include any system, device, or apparatus configured to measure acceleration (e.g., proper acceleration) experienced by information handling system 102. Accordingly, accelerometer 126 may measure a gravitational orientation of information handling system 102.

Magnetometer 128 may be communicatively coupled to sensor controller 122, and may include any system, device, or apparatus configured to measure the strength and/or direction of a magnetic field (e.g., the Earth's magnetic field). Accordingly, magnetometer 128 may operate as a compass to determine geographical location.

Proximity sensor 130 may be communicatively coupled to sensor controller 122, and may include any system, device, or apparatus configured to detect the presence of a nearby object without physical contact. To perform the detection, proximity sensor 130 may emit an electromagnetic field or a beam of electromagnetic radiation (infrared, for instance), and detect changes in the field and/or return signal. The object being sensed is often referred to as the proximity sensor's target. In some embodiments, proximity sensor 130 may comprise a capacitive or a photoelectric sensor. In these and other embodiments, proximity sensor 130 may be operable to detect (and ignore) unintended touchscreen interactions when a mobile telephony device is held close to a user's ear during a telephonic conversation.

Location sensor 132 may be communicatively coupled to sensor controller 122, and may include any system, device, or apparatus configured to process (with or without the aid of sensor controller 122) satellite signals received from a satellite navigation system (e.g., Global Positioning System (GPS), Global Navigation Satellite System (GLONASS), etc.). Based on such received satellite signals, location sensor 132 may, with or without the aid of sensor controller 122, determine a location of information handling system 102 and/or the present time.

In addition to processor 103, memory 104, wireless network interface 106, user interface 110, sensor controller 122, gyroscope 124, accelerometer 126, magnetometer 128, proximity sensor 130, and location sensor 132, information handling system 102 may include one or more other information handling resources, including one or more other sensors.

FIG. 2 illustrates a block diagram of selected components of example wireless network interface 106, in accordance with certain embodiments of the present disclosure. As shown in FIG. 2, wireless network interface 106 may comprise radio-frequency transmit and receive paths comprising a baseband processor 202, a radio frequency integrated circuit 204, a power amplifier 206, radio-frequency element matching 208, an impedance tuner 210, an aperture tuner 212, and an antenna 214. In addition to baseband processor 202, radio frequency integrated circuit 204, power amplifier 206, radio-frequency element matching 208, impedance tuner 210, aperture tuner 212, and antenna 214, wireless network interface 106 may include one or more other information handling resources, including one or more additional antennas 214.

Baseband processor 202 may be communicatively coupled to processor 103 and may include any system, device, or apparatus configured to manage and/or control wireless communication functions of wireless network interface 106. In addition, baseband processor 202 may also process data to be transmitted from and/or data received by wireless network interface 106, and thus may serve as an interface between processor 103 and the radio frequency transmit/receive path. As shown, in FIG. 2, baseband processor 202 may generate one or more control signals for controlling operation of components of wireless network interface 106.

Radio frequency integrated circuit 204 may be communicatively coupled to processor 103 and may include any system, device, or apparatus configured to condition data for transmission from wireless network interface 106 and/or condition data received by wireless network interface 106 for processing by baseband processor 202 and/or processor 103. Accordingly, radio frequency integrated circuit 204 may include, among other things, one or more analog-to-digital converters, one or more digital-to-analog converters, one or more oscillators (e.g., for producing an analog waveform of a particular frequency for modulation or upconversion of an analog signal to a wireless communication signal, or for demodulation or downconversion of a wireless communication signal to an analog signal), one or more upconverters (e.g., to frequency upconvert a baseband analog signal to a wireless communication signal at a radio frequency), and/or one or more downconverters (e.g., to frequency downconvert a wireless communication signal received via antenna 214 to a baseband analog signal).

Power amplifier 206 may include any system, device, or apparatus configured to amplify a radio frequency signal to be transmitted by antenna 214, in order to permit the transmitted signal to have sufficient energy to be effectively broadcast from antenna 214. In some embodiments, a gain and/or another parameter of power amplifier 206 may be controlled in response to one or more control signals generated by baseband processor 202.

Radio frequency front-end module (RFEM) 208 may include functional elements such as, for example, filters, amplifiers, and switches and impedance matching between these elements where required. RFEM 208 may include different combinations of components and integration levels depending on factors such as the wireless application, frequency band, standards requirements, overall design topology, technology selection, footprint, cost etc. Example types of RFEM may include:

An antenna switch module that includes an antenna switch and low pass filters.

A power amplifier module that integrates several power amplifiers in the one module.

A switch filter module that integrates a receiver band pass filter with an antenna switch module.

A transmit module that combines an antenna switch module with a power amplifier module.

A power amplifier-duplexer module that integrates power amplifiers with duplexers in the same module.

A switch duplexer module that integrates an antenna switch and duplexers.

A switch filter and duplexer module that integrates a switch filter module and single duplexer.

In some embodiments, one or more parameters of radio frequency matching element 208 may be controlled in response to one or more control signals generated by baseband processor 202.

Impedance tuner 210 may include any system, device, or apparatus configured to improve power transfer between antenna 214 and the remainder of the transmit/receive path of wireless network interface 106, for example, by performing power factor correction by matching an impedance of antenna 214 to an impedance of the transmit/receive path. In some embodiments, an impedance and/or another parameter of impedance tuner 210 may be controlled in response to one or more control signals generated by baseband processor 202.

Aperture tuner 212 may include any system, device, or apparatus configured to tune the effective aperture of antenna 214, wherein effective aperture of antenna 214 may be defined as the area, oriented perpendicular to the direction of an incoming radio wave, which would intercept the same amount of power from that wave as is produced by antenna 214. Typically, to increase the effective aperture requires an increase in power to antenna 214. Thus, oftentimes to conserve power a smaller aperture is employed.

In operation, sensor controller 122 may receive sensor signals from a plurality of sensors. In some embodiments, sensor controller 122 may further execute an algorithm to, based on the received sensor signals, determine usage conditions and/or environmental conditions associated with information handling system 102. In such embodiments, sensor controller 122 may determine a context mode based on such received sensor signals. Sensor controller 122 may in turn communicate fused sensor information (e.g., the context mode) to baseband processor 202 (e.g., via processor 103) indicative of the parameters sensed by the sensors. Based on such fused sensor information, baseband processor 202 may tune one or more parameters of one or more components of the radio-frequency transmit/receive path, including without limitation a gain of power amplifier 206, a parameter of RFEM 208, an impedance of impedance tuner 210, and an effective aperture of aperture tuner 212.

FIG. 3 illustrates a flow chart of an example method 300 for dynamic transmit/receive path adaptation based on sensor data, in accordance with certain embodiments of the present disclosure. According to some embodiments, method 300 may begin at step 302. As noted above, teachings of the present disclosure may be implemented in a variety of configurations of information handling system 102.

At step 302, baseband processor 202 may receive fused sensor information from sensor controller 122 (e.g., via processor 103). In some embodiments, communication of data from sensor controller 122 to baseband processor 202 may be facilitated by appropriate application programming interfaces (APIs). For example, baseband processor 202 may call an appropriate API function to retrieve fused sensor information.

At step 304, baseband processor 202 may, based on fused sensor information and operating parameters of the transmit/receive path, dynamically configure one or more parameters of one or more components of the radio-frequency transmit/receive path, including without limitation a gain of power amplifier 206, a parameter of RFEM 208, an impedance of impedance tuner 210, and an effective aperture of aperture tuner 212. In effect, the tuning performed at step 304 may be a coarse tuning of transmit/receive path parameters.

At step 306, baseband processor 202 may iterate configuration of the parameters of the one or more components of the radio-frequency transmit/receive path until desired conditions (e.g., antenna pattern, standing wave ratio, etc.) are achieved. After completion of step 306, method 300 may proceed again to step 302, such that fused sensor parameters and operating parameters of the transmit/receive path may be continuously monitored and baseband processor 202 can tune parameters of the transmit/receive path to optimize performance. In effect, the tuning performed at step 306 may be a fine tuning of transmit/receive path parameters.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a plurality of sensors, each sensor configured to detect an environmental condition and generate a sensor signal indicative of the environmental condition, wherein the plurality of sensors include at least two of: a gyroscope, an accelerometer, a magnetometer, and a location sensor;
   a sensor controller communicatively coupled to the processor and configured to:
      receive a plurality of sensor signals, including a sensor signal from each of the plurality of sensors; and
      determine based on the plurality of sensor signals an operating context indicative of at least one of: usage conditions and environment conditions;
   a wireless network interface communicatively coupled to the processor, wherein the wireless network interface includes:
      a baseband controller communicatively coupled to the processor and further coupled to a transmit/receive path, wherein the transmit/receive path includes:
         a radio frequency integrated circuit configured to:
            condition outgoing data for wireless transmission; and
            condition wirelessly received incoming data for processing;
         a front end module comprising:
            a power amplifier module integrating a plurality of power amplifiers;
            a receiver band pass filter; and
            an antenna switch module including an antenna switch and a plurality of low pass filters;
         an impedance tuner; and
         an aperture tuner;
      wherein the baseband controller is configured to perform operations comprising:
         receiving context information indicative of the operating context;
         performing a first configuration of the front end module in accordance with the operating context, wherein the first configuration includes a first tuning of a gain of the power amplifier module; and
         iteratively performing fine configuration of the front end module based on one or more parameters of the transmit/receive path until a desired condition is detected wherein the one or more parameters of the transmit/receive path include one or more of:
an impedance of the impedance tuner; and
an effective aperture of the aperture tuner.

2. The information handling system of claim 1, wherein the power amplifier module further includes one or more duplexers.

3. The information handling system of claim 1, wherein the antenna switch module further includes one or more duplexers.

4. The information handling system of claim 1, wherein the front end module includes a switch filter and duplexer module comprising the receiver band pass filter integrated with the antenna switch module integrated with a single duplexer.

5. A wireless network interface of an information handling system, the wireless network interface comprising:
a baseband controller communicatively coupled to the processor and further coupled to a transmit/receive path, wherein the transmit/receive path includes:
a radio frequency integrated circuit configured to:
condition outgoing data for wireless transmission; and
condition wirelessly received incoming data for processing;
a front end module comprising:
a power amplifier module integrating a plurality of power amplifiers;
a receiver band pass filter; and
an antenna switch module including an antenna switch and a plurality of low pass filters;
an impedance tuner; and
an aperture tuner;
wherein the baseband controller is configured to perform operations comprising:
receiving context information indicative of the operating context;
performing a first configuration of the front end module in accordance with the operating context, wherein the first configuration includes a first tuning of a gain of the power amplifier module; and
iteratively performing fine configuration of the front end module based on one or more parameters of the transmit/receive path until a desired condition is detected wherein the one or more parameters of the transmit/receive path include one or more of:
an impedance of the impedance tuner; and
an effective aperture of the aperture tuner.

6. The wireless network interface of claim 5, wherein the power amplifier module further includes one or more duplexers.

7. The wireless network interface of claim 5, wherein the antenna switch module further includes one or more duplexers.

8. The wireless network interface of claim 5, wherein the front end module includes a switch filter and duplexer module comprising the receiver band pass filter integrated with the antenna switch module integrated with a single duplexer.

9. A method comprising:
receiving, by a sensor controller device of an information handling system, a plurality of sensor signals, including a sensor signal from each of a plurality of sensors, wherein the plurality of sensors include a gyroscope, an accelerometer, a magnetometer, and a location sensor;
determining, based on the plurality of sensor signals, an operating context indicative of at least one of: usage conditions and environment conditions;
performing, by a baseband controller of a wireless network interface, baseband controller operations, wherein the wireless network interface includes a transmit/receive path, comprising:
a radio frequency integrated circuit configured to:
condition outgoing data for wireless transmission; and
condition wirelessly received incoming data for processing; and
a front end module comprising:
a power amplifier module integrating a plurality of power amplifiers;
a receiver band pass filter; and
an antenna switch module including an antenna switch and a plurality of low pass filters; and
an impedance tuner; and
an aperture tuner;
wherein the baseband controller operations include:
receiving context information indicative of the operating context;
performing a first configuration of the front end module in accordance with the operating context, wherein the first configuration includes a first tuning of a gain of the power amplifier module; and
iteratively performing fine configuration of the front end module based on one or more parameters of the transmit/receive path until a desired condition is detected
wherein the one or more parameters of the transmit/receive path include one or more of:
an impedance of the impedance tuner; and
an effective aperture of the aperture tuner.

10. The method of claim 9, wherein the power amplifier module further includes one or more duplexers.

11. The method of claim 9, wherein the antenna switch module further includes one or more duplexers.

12. The method of claim 9, wherein the front end module includes a switch filter and duplexer module comprising the receiver band pass filter integrated with the antenna switch module integrated with a single duplexer.

13. The method of claim 9, wherein the desired condition comprises a desired antenna patter.

14. The method of claim 9, wherein the desired condition comprises a desired standing wave ratio.

* * * * *